No. 726,609. PATENTED APR. 28, 1903.
W. A. YOUNG.
FRICTION CLUTCH.
APPLICATION FILED JAN. 28, 1903.
NO MODEL. 2 SHEETS—SHEET 2.
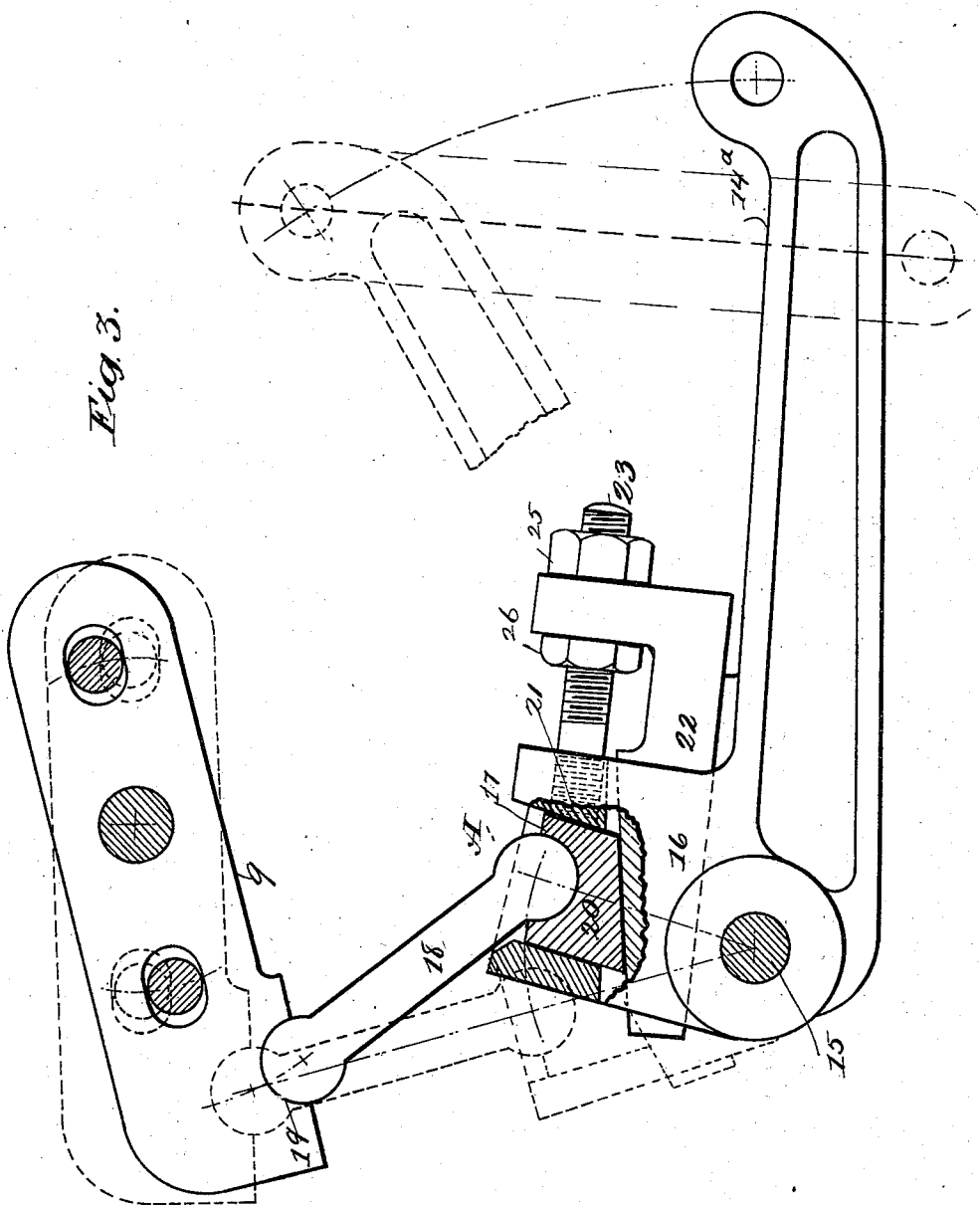
WITNESSES:
A. H. Gebert.
C. H. Olds.
INVENTOR.
William A. Young
BY Wm. H. Monroe
ATTORNEY.

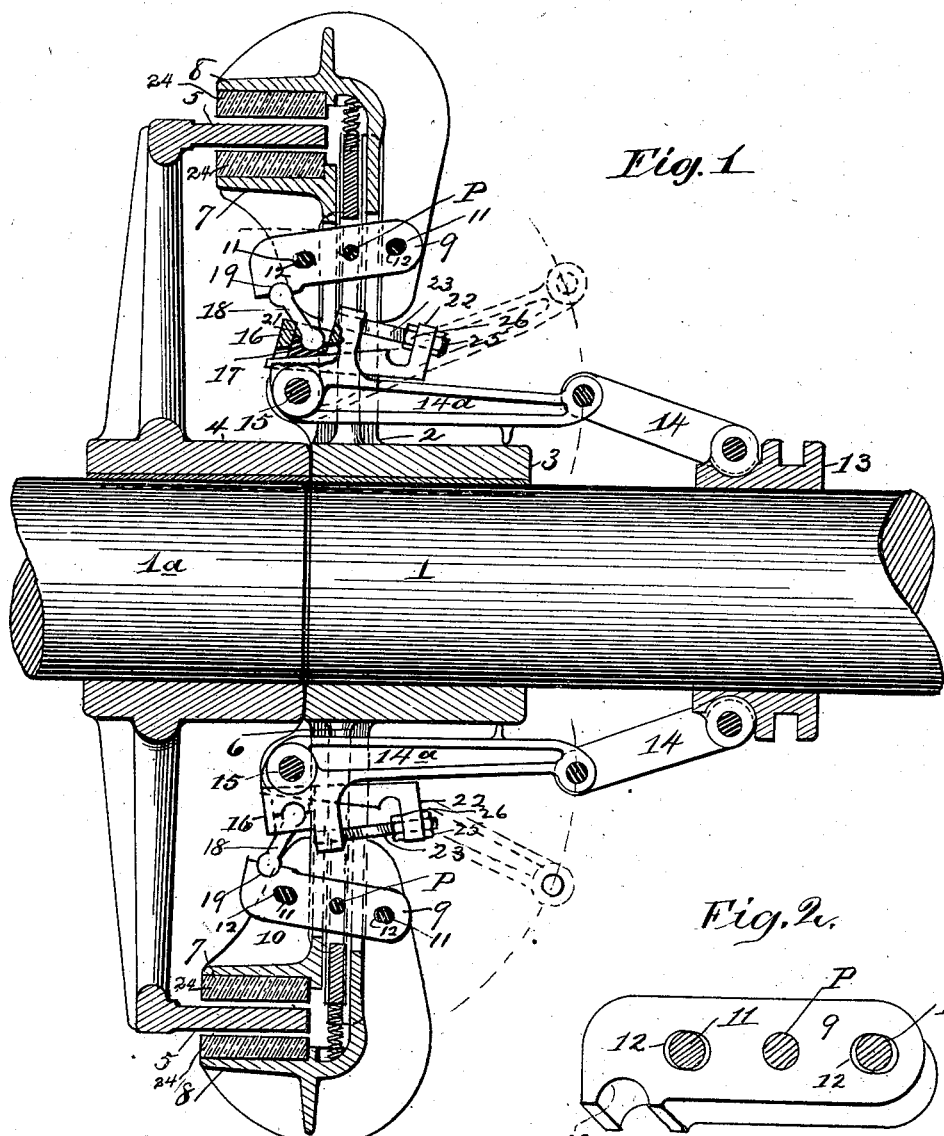

UNITED STATES PATENT OFFICE.

WILLIAM A. YOUNG, OF CUYAHOGA FALLS, OHIO.

FRICTION-CLUTCH.

SPECIFICATION forming part of Letters Patent No. 726,609, dated April 28, 1903.

Application filed January 28, 1903. Serial No. 140,900. (No model.)

*To all whom it may concern:*

Be it known that I, WILLIAM A. YOUNG, a citizen of the United States, and a resident of Cuyahoga Falls, county of Summit, State of Ohio, have invented certain new and useful Improvements in Friction-Clutches, of which I hereby declare the following to be a full, clear, and exact description, such as will enable others skilled in the art to which it appertains to make and use the same.

The objects of the invention may be stated as follows: First, to increase the power of the clutch by an arrangement of levers which are positive and unvarying in action and in which the leverage increases as the gripping members approach the flange and are of unyielding construction, so that they will deliver the final pressure to the gripping members without springing or yielding in any way; second, to decrease the friction and wear of the working parts; third, to provide an adjustment for varying the pressure or for compensating for wear that will not change the relative position of the moving parts; fourth, to provide a powerful leverage device for the clutch in which the members shall in no case slide or roll on one another; fifth, to reduce to a minimum all tendency of the release produced by locking the clutch.

With these objects in view my invention consists in the lever-and-knuckle mechanism, in means for adjusting the same without altering the relations of the various parts to one another, and in the construction of details, as hereinafter described, shown in the accompanying drawings, and specifically pointed out in the claims.

In the accompanying drawings, Figure 1 is a vertical section through the clutch and all associated mechanism, showing the clutch employed as a shaft-coupling. Fig. 2 is an enlarged detail of intermediate lever-and-knuckle device employed in the connecting mechanism between the jaws and shifter. Fig. 3 is a diagrammatic view of the movements of the lever and toggle.

In these views, 1 and 1ª are the shafts or axes for the various parts.

2 represents the clutch-frame, and 3 the hub, which may be keyed to the shaft.

4 represents a hub keyed upon the shaft 1ª and provided with radial arms and with the annular flange 5. A plurality of radial arms 6 are provided for the clutch-frame, arranged at regular intervals about the hub 3, in which the jaws 7 and 8 are mounted. These parts being similar in each case, the description of one set of operating parts throughout will be sufficient to the understanding of all.

7 is the inner jaw, which is adapted to engage the inner face of the flange 5, and 8 is the outer jaw, which engages the outer face of the flange. The engaging surfaces of these jaws are provided with suitable lining material to make the necessary frictional contact with the flange, such as wood. These jaws slide in suitable guideways in the arms 6 of the clutch-frame and do not materially differ from such guides in clutch-frames now in use. The operating mechanism by means of which these jaws are made to simultaneously approach and retire from the flange is constructed as follows: A rock-arm 9, pivoted upon the radial arm of the clutch-frame at P, connects the lower extremities 10 of the jaws by means of pivot-pins 11, inserted through short slots 12 in the jaws. It will readily be observed that a rocking motion of this rock-arm will draw the jaws together upon the flange or force them apart, according to the direction of the movement. To accomplish these objects by means of positively-acting mechanism accessible to the operator from the outside of the shaft-coupling, a shifter-sleeve 13 is placed over the shaft. To this is pivoted one end of a link 14, the other end of which is pivoted to the outer extremity of a fixed long arm of the lever 14ª, which is pivoted in turn or fulcrumed at 15 upon the hub of the clutch-frame. A short arm 16 upon this lever is provided with an adjustable socket 17, in which plays the extremity of the short knuckle 18. This adjustable socket consists of a block 17, slidingly mounted in a guide-slot 21 in the short arm, where the sliding block is adjustable radially to and from the fulcrum-point by means of a wedge 22 and adjusting-screw 23, so that the angle of the center lines of the socket-arm and long arm remains always the same. The outer extremity of this knuckle is provided with a socket 19 in the rock-arm 9. The extremities of the knuckle are provided with cylindrical ends and the solid socket-bearings are also cylindrical. A nut 25 and locknut 26 serve to adjust the relations of the sliding block and incline of the wedge to a minute fraction, so that the jaws may be set to engage flanges of varying thickness and also to take up wear of the shoes 24.

In operation it will be seen that as soon as the shifter-sleeve is moved toward the clutch-frame the outer end of the lever 14$^a$ will rise and the short arm 16 will move inward, thus straightening the knuckle 18 and elevating the inner side of the rock-arm 9 to raise the inner jaw, while lowering the outer end of the rock-arm and lowering the outer jaw. The pivotal points of the jaws being at equal distance from the central pivot, the jaws will move exactly alike.

A distinct advantage is obtained over all moving surfaces in contact as seen in common use, where one lever plays upon another or a friction-roller on one lever plays upon the other lever, the disadvantage being found in the great wear under pressure of the parts, which throws the parts out of adjustment, and if, as in some clutches, a roller on one part bears upon an inclined or wedge surface the wear therein prevents adjustment thereafter.

Regarding the first object mentioned—viz., to increase the power of the clutch—a complete "toggle-joint" is formed, one arm of which is the short arm 16 of the lever and the other arm is the "knuckle" 18, which delivers its motion to the rock-arm in connection with the gripping members. These two arms form substantially a straight line when the clutch is thrown into engagement, and since the final leverage exerted by this type of linkage approaches an infinite quantity the pressure will be very great. The knuckle being constructed with cylindrical ends fitted into cylindrical end bearings or fixed sockets will deliver the pressure produced by its final leverage to the rock-arm without springing or yielding and will not fail to transfer motion by its final leverage. The second object, that of reducing friction, is also obtained by the use of the cylindrical bearings, which admit of machine-finish and cannot collect dirt. The third advantage, that of an adjustment which will not alter the relative position of the parts, is seen in the radial arrangement of the sliding block from the fulcrum-point through the center of the socket. Thus all adjustments are made without varying the angle of the short and long arms of the lever or changing the relation of one moving part to the others. The fourth object is accomplished by means of the socket-joints, so that there is no wear to change the surfaces, no new working surface being brought to bear. This simplifies the adjustment in every way. The fifth object, to reduce the movement of the release to a minimum, is important. All clutches of this type are operated by a sliding sleeve on the shaft, and the link-pivot connected to the shifting sleeve passes under the other pivot connected with the lever a sufficient distance to lock the parts. In this clutch the travel of the central toggle-joint A, Fig. 4, as seen in dotted lines, is that of the closed position or position of least motion to the rock-arm, and a slight release on the long arm of the lever would not be perceptible to the rocker, and consequently would produce no perceptible release to the gripping-jaws; but all release can be avoided by making the angle between the long and short arms of the lever such that the arms of the toggle-joint will form a straight line at the locked position of the sliding sleeve, thus producing positively no release of the gripping members and will eliminate entirely this defect. The adjustment being made in a radial line would not, therefore, change these conditions.

Having described my invention, what I claim as new, and desire to secure by Letters Patent, is—

1. The combination in a friction-clutch, of a rotary member having an annular flange, a pair of jaws adapted to engage the outer and inner sides of the flange, a rock-arm connecting the inner extremities of said jaws, a clutch-frame to which said rock-arm is pivoted, an axial shaft on which the clutch-frame is secured, a shifter on said shaft, and lever-and-knuckle mechanism connecting said shifter and said rock-arm, the said knuckle being mounted in solid unyielding bearings or sockets in adjacent parts, substantially as described and for the purpose set forth.

2. The combination, in a friction-clutch comprising oppositely-moving jaws and a clutch-frame in which said jaws are free to slide in a radial direction, of an axial shaft, a lever fulcrumed on the clutch-frame and provided with long and short arms, a shifter on the shaft, a link connecting said shifter and long arm, an unyielding socket in said short arm, a knuckle mounted in said socket at one extremity and a rock-arm pivoted to the clutch-frame, to which in turn the extremities of the jaws are pivoted, and provided with an unyielding socket in which the other extremity of said knuckle is mounted, substantially as described.

3. The combination, in a friction-clutch comprising oppositely-moving jaws and a clutch-frame in which said jaws are free to slide in a radial direction, of an axial shaft, a lever fulcrumed on the clutch-frame and provided with long and short arms; a shifter on the shaft a link connecting said shifter and long arm, a rock-arm pivoted to the clutch-frame to which in turn the extremities of the jaws are pivoted; a knuckle connecting the rock-arm and short arm of the said lever and provided with a solid bearing in one of said members, a sliding block in one or the other member in which the said knuckle has a solid bearing, and a positive adjustment for said block, substantially as described.

4. The combination, in a friction-clutch comprising oppositely-moving jaws and a clutch-frame in which said jaws are free to slide in a radial direction, of an axial shaft, a lever fulcrumed on the clutch-frame and provided with long and short arms, a shifter on the shaft, a link connecting said shifter and long arm, a rock-arm pivoted to the clutch-frame, to which in turn the extremities of the jaws are pivoted, a knuckle connecting the rock-arm and short arm of the said lever, and provided with a solid bearing in the rock-arm, a socket for the knuckle in the short arm adjusting radially with the fulcrum-point of the lever, and means for positively effecting said radial adjustment, substantially as described.

5. In a friction-clutch, the combination with a circular flange and radially-movable jaws adapted to grip said flange, of a rock-arm to which said jaws are pivoted, a hub and arm in which said rock-arm is centrally pivoted, a lever fulcrumed upon said hub, and provided with a short arm, a sliding block in said short arm, movable radially to said fulcrum-point, an adjusting-wedge underneath said block, and a knuckle connecting the sliding block and one end of the rock-arm and having its ends embedded in solid cylindrical bearings, whereby the short arm of the lever and the knuckle-joint form a toggle adapted to increase the pressure on the jaws as they arrive at the closing position.

In testimony whereof I hereunto set my hand this 3d day of January, 1902.

WILLIAM A. YOUNG.

Witnesses:
WM. M. MONROE,
C. H. OLDS.